United States Patent [19]

Bradley

[11] 4,003,345
[45] Jan. 18, 1977

[54] FUEL REGENERATED NON-POLLUTING INTERNAL COMBUSTION ENGINE

[76] Inventor: Curtis E. Bradley, 4517 Calle Vengura, Phoenix, Ariz. 85018

[22] Filed: Oct. 6, 1975

[21] Appl. No.: 620,023

Related U.S. Application Data

[62] Division of Ser. No. 456,974, April 1, 1974, Pat. No. 3,939,806.

[52] U.S. Cl. ..................................... 123/3; 60/597; 123/DIG. 12; 123/119 E
[51] Int. Cl.² ........................................ F02B 43/08
[58] Field of Search .......... 123/1 A, 3, 41.2, 41.21, 123/119 E, 121, DIG. 12; 60/39.18 B, 597, 616, 618

[56] References Cited
UNITED STATES PATENTS

| | | | |
|---|---|---|---|
| 1,380,183 | 5/1921 | Boisen ........................ | 123/DIG. 12 |
| 1,966,345 | 7/1934 | Harrell ............................. | 123/121 |
| 2,360,969 | 10/1944 | Newcombe ...................... | 60/616 |
| 2,509,498 | 5/1950 | Heyl ............................ | 123/DIG. 12 |
| 2,633,707 | 4/1953 | Hermitte et al. ............... | 60/39.18 B |
| 3,311,097 | 3/1967 | Mittelstaedt ................. | 123/DIG. 12 |
| 3,362,883 | 1/1968 | Wright ........................ | 123/DIG. 12 |
| 3,459,953 | 8/1969 | Hughes et al. ............... | 123/DIG. 12 |
| 3,653,364 | 4/1972 | Bogan .................... | 123/3 |
| 3,704,587 | 12/1972 | Krieb et al. .................... | 60/39.18 B |
| 3,792,690 | 2/1974 | Cooper .................... | 123/3 |

*Primary Examiner*—Wendell E. Burns
*Assistant Examiner*—David D. Reynolds
*Attorney, Agent, or Firm*—John A. Robertson

[57] ABSTRACT

An internal combustion engine in which heat is derived from the engine cooling system and/or the exhaust to heat a working fluid in a closed circulatory system. This heat transforms the working fluid into a gas which is delivered to a turbine which drives a generator. The generator delivers DC current to an electrolysis cell in which water is decomposed. The water is decomposed by the electric current into its oxygen and hydrogen components. The oxygen is passed to the air intake of the engine carburetors, while the hydrogen is conveyed to a carburetor therefor. Also included is a carburetor for conventional hydrocarbon fuels. The two carburetors are connected by linkage which may be operated either manually or by pressure to vary the ratio of the carbureted fuels which are delivered to the engine.

Certain auxiliary equipment is provided in the form of an air-cooled condenser in the working fluid system, a supply tank for the hydrocarbon fuel, which ordinarily is gasoline, a water supply tank, a tank for receiving hydrogen under pressure, a pump for the hydrocarbon fuel, a pump for the working fluid system, a pump for delivering water from the water tank to the electrolysis cell and a hydrogen pump which passes hydrogen to the hydrogen carburetor and/or the hydrogen tank.

In a modification, power is derived from the engine exhaust to drive a turbo-generator which delivers DC current to the electrolysis cell. This current may be supplemented by that provided by a generator that is driven by a turbine powered by the working fluid of a system that is heated by the cooling system of the engine.

2 Claims, 5 Drawing Figures

FUEL REGENERATED NON-POLLUTING INTERNAL COMBUSTION ENGINE

This application is a division of the co-pending application of Curtis E. Bradley, Ser. No. 456,974, filed Apr. 1, 1974, now U.S. Pat. No. 3,939,806 for a "Fuel Regenerated Non-Polluting Internal Combustion Engine."

The present invention relates to internal combustion engines and is concerned primarily with the generation of power derived from engine heat to produce an electric current which decomposes water to provide hydrogen which is used as fuel for the engine.

BACKGROUND OF THE INVENTION

At the present time, the public is confronted with two basic problems related to the consumption of fuel in an internal combustion engine. One of these problems is the pollution of the ambient atmosphere by the products of combustion. These noxious products are oxides of nitrogen ($NO_X$), carbon monoxide (CO) and unburned hydrocarbons (HC). Of late, considerable attention has been devoted in attempt to minimize if not completely obviate these noxious products of combustion.

The other problem deals with the conservation of fuel. The country is now faced with an energy shortage and much effort has been directed to the broad object of regenerating fuel from the heat of the engine, with the regenerated fuel being passed back to the engine for consumption therein.

It is now a well recognized phenomenum that when hydrogen is used as a fuel in an internal combustion engine the noxious products of combustion while pollute the atmosphere are reduced to a high degree if not completely eliminated. This has been found to be true not only when the hydrogen is the only fuel used, but also when the hydrogen is combined with conventional hydrocarbon fuels such as gasoline, diesel oil and the like.

The decomposition of water into its components of oxygen and hydrogen by passing an electric current therethrough is also a now well recognized phenomenum. Other methods of decomposing water to provide oxygen have also been proposed. One of these is to pass water or steam into contact with heated ferrous balls. Moreover, it has been proposed to use hydrogen so generated as a fuel in internal combustion engines. However, from the apparent lack of public acceptance of such technology, it is believed that this failure is due to the highly inefficient nature of such processes.

The present invention is founded on the basic concept of utilizing heat derived from an internal combustion engine to generate electric power which decomposes water to provide hydrogen with is used in the engine. Thus, air pollution is reduced or avoided to a large extent and energy is conserved.

OBJECTS OF THE INVENTION

With the foregoing conditions in mind, the present invention has in view the following objectives:

1. To provide an internal combustion engine including means for deriving heat from the engine, utilizing this heat to generate an electric current, decomposing water by passing the electric current therethrough to provide hydrogen, and then using the hydrogen as a fuel in the engine.

2. To provide, in an internal combustion engine of the type noted, a circulatory system for a working fluid and which includes means for heating the working fluid either from the engine cooling system and/or the engine exhaust.

3. To provide, in an internal combustion engine of the character aforesaid, a turbine which is driven by the working fluid as it is expanded into gases. This turbine generator system may be of the type commonly known as a Rankine Cycle.

4. To provide, in an internal combustion engine of the kind described, a generator which is driven by the turbine and which generates a DC current which is conducted to an electrolysis cell.

5. To provide, in conjunction with an internal combustion engine of the type noted, a water supply tank from which water is passed to the electrolysis cell.

6. To provide, in conjunction with an internal combustion engine of the character aforesaid, a hydrogen tank into which hydrogen is introduced from the electrolysis cell under pressure.

7. To provide, in an internal combustion engine of the kind described, a conduit which conducts hydrogen from the electrolysis cell and/or the hydrogen tank to a hydrogen carburetor.

8. To provide, in an internal combustion engine of the type noted, a conduit for passing oxygen from the electrolysis cell to the air intake of the engine.

9. To provide, in an internal combustion engine of the character aforesaid, a fuel pump for conducting hydrocarbon fuel from a fuel tank to a carburetor, a pump for the working fluid system, a pump for delivering water from the water tank to the electrolysis cell, and a pump for introducing hydrogen into the hydrogen tank under pressure.

10. To provide, in an internal combustion engine of the kind described, a turbo-generator that is powered by exhaust gases to provide DC current to an electrolysis cell.

11. To provide, in an internal combustion engine of the type noted, a second generator in addition to the turbogenerator aforesaid, that is driven by a working fluid that is heated by the engine cooling system.

Various other more detailed objects and advantages of the invention, such as arise in connection with carrying out the above ideas in a practical embodiment will, in part, become apparent and, in part, be hereafter stated as the description of the invention proceeds.

SUMMARY OF THE INVENTION

The foregoing objects are achieved by providing an internal combustion engine which includes a cooling system, a fuel intake manifold and an exhaust manifold having an exhaust pipe extending therefrom, with a circulatory system which derives heat from the cooling system and the exhaust pipe for a working fluid which may be water or freon. A turbine in a Rankine Cycle is included in the working fluid system and is operated by the gases derived from heating the working fluid. The working fluid system is closed and also includes a condenser for converting the gaseous working fluid back to its liquid form and a pump for circulating the working fluid. A generator is driven by the turbine and is connected by appropriate conductors with an electrolysis cell into which the water is introduced from a water supply tank.

Mounted on top of the engine in accordance with conventional practice is an air filter, and immediately below this air filter are two carburetors which communicate with the intake manifold of the engine. One of these carburetors is for conventional hydrocarbon fuel and the other is for hydrogen. The hydrocarbon fuel is conducted from a supply tank therefor to the carburetor for hydrocarbon fuel through a conduit including a pump. Another conduit extends from the other carburetor which is for hydrogen to that portion of the electrolysis cell in which hydrogen is collected. A pump connected to this portion of the cell is connected to a conduit which extends both to the hydrogen carburetor and a tank for receiving hydrogen under pressure. A valve is included in this conduit and is operable to determine when hydrogen is delivered to the hydrogen carburetor.

The air filter includes an air intake and oxygen from the electrolysis cell is passed to this air intake where it is mixed with ambient air to provide oxygen-enriched air which is delivered to both carburetors.

In a modification, a turbo-generator is driven directly by gases from the engine exhaust to provide DC current to the electrolysis cell. This turbo-generator may be used alone or in combination with another generator driven by a turbine which is powered by the working fluid in a closed system that is heated by the engine cooling system.

Now known internal combustion engines may be catalogued into three types. One is the conventional Otto cycle internal combustion engine now widely used in which the fuel is ignited by spark plugs. The second is the well known diesel cycle engine in which the fuel is ignited by compression of the intake air gases. The third is the Brayton cycle turbine type internal combustion engine in which the fuel is burned at constant pressure to drive a turbine rather than a piston. The present invention is susceptible of embodiment in the internal combustion engines of each of the above noted types. The invention as applied to the first type is summarized in the preceding paragraphs. The apparatus required for a diesel engine is substantially the same, with the notable exception that the carburetor for the hydrocarbon fuel and the fuel intake manifold are replaced by fuel injectors. In the case of the turbine engine, the working fluid circulatory system, turbine included therein, generator, electrolysis cell, fuel supply tank, water supply tank, hydrogen tank and pumps therefor are the same as described in the preceding paragraphs. The difference between this embodiment of the invention and the others resides in the construction of the turbine engine.

For a full and more complete understanding of the invention, reference may be had to the following description and the accompanying drawings, wherein.

DESCRIPTION — FIRST EMBODIMENT

Figure 1:
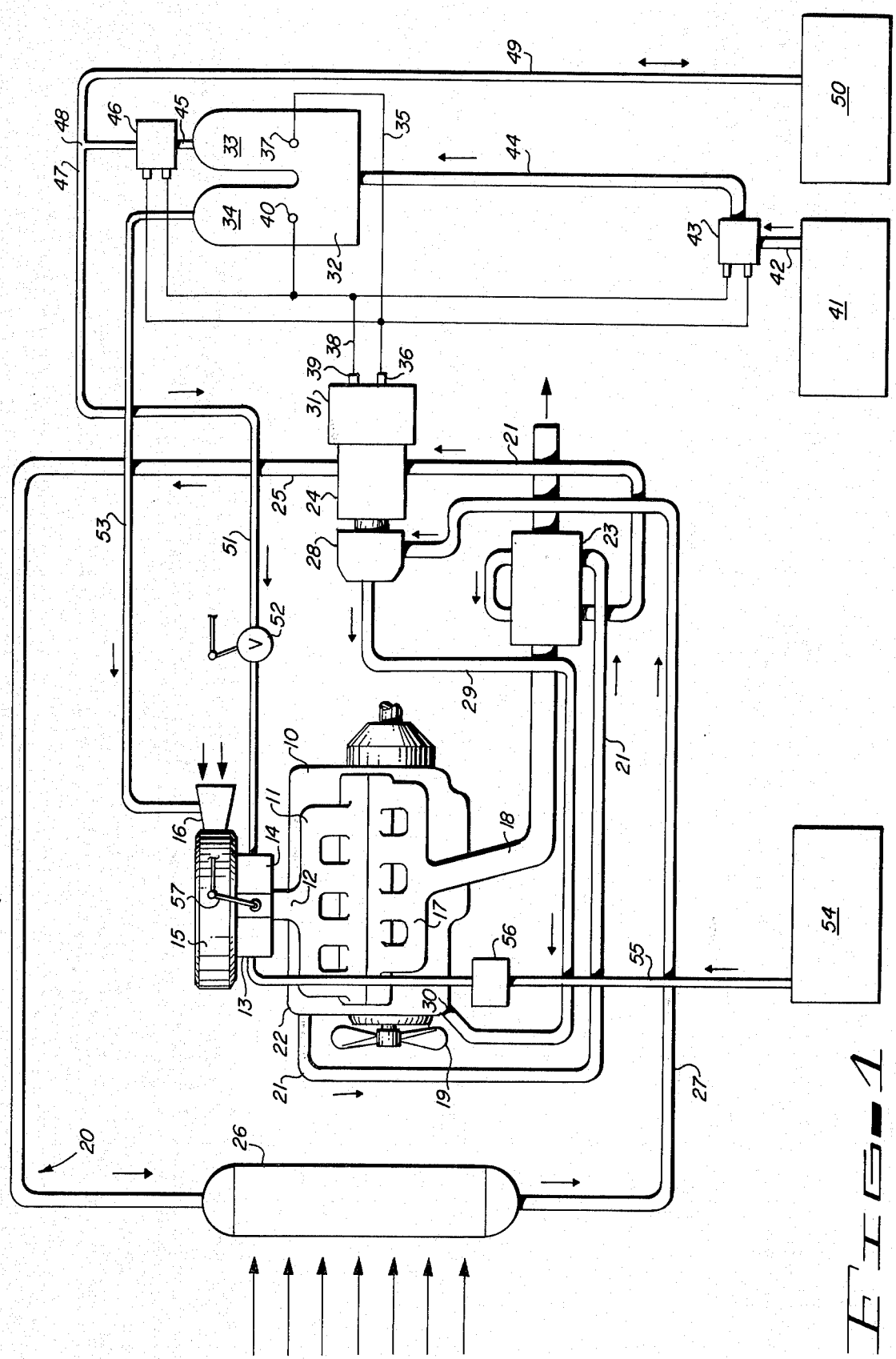
FIG. 1 is a diagrammatic view illustrating the essential elements of the present invention as applied to a conventional internal combustion engine of the piston type in which the fuel is ignited by spark plugs.

Referring now to the drawings, wherein like reference characters denote corresponding elements throughout the several views, and first to FIG. 1, an internal combustion engine of the piston type in which the fuel is ignited by spark plugs is shown as including an engine block represented at 10. Mounted on engine block 19 is a fuel intake manifold 11 having a main stem 12 on which is mounted a carburetor or injector 13 for hydrocarbon fuel such as gasoline and a hydrogen carburetor or injector 14. Both of the carburetors 13 and 14 communicate with stem 12. Mounted above carburetors 13 and 14 is an air filter 15 having an air intake 16.

Carried by engine block 10 is an exhaust manifold 17 from which extends an exhaust pipe 18. Engine block 10 includes a cooling system in accordance with accepted practice and hence is not herein illustrated. However, a fan which may be considered as a part of the cooling system is illustrated at 19.

A closed circulatory system as in a Rankine Cycle for a working fluid such as water or freon is designated generally 20. It comprises a conduit 21 which is in heat conducting relation to the cooling system of the engine at the point indicated at 22. It extends to and passes through a heat exchanger 23 which is disposed about exhaust pipe 18. From heat exchanger 23 conduit 21 is continued to a turbine 24 which is of the kind typified by the Rankine Cycle. The working fluid which originally is in liquid form is converted into a gaseous state by the heat derived from the cooling system of the engine and the exhaust pipe and drives the turbine 24. From the latter, another conduit 25 extends to a condenser 26 which returns the working fluid to its liquid form. From condenser 26 another conduit 27 extends to a pump 28, and from the latter a conduit 29 extends to the engine block 10 at a point 30, from whence it is connected to conduit 21 at point 22, being in heat conducting relation to the cooling system of the engine.

The operation of the closed system 20 may be summarized by noting that the working fluid in liquid form is delivered by pump 28 to that portion of the system which is in heat conducting relation to the cooling system of the engine. Thus, the working fluid is heated from the latter. It is further heated by heat exchanger 23 and this heat transfers the working fluid into a gaseous state which operates Rankine turbine 24. It is conducted in gaseous form to condenser 26 which returns it to liquid form.

An electric generator is indicated at 31 and an electrolysis cell at 32. The electrolysis cell is shown as having two legs 33 and 34. A conductor 35 connects a terminal 36 of generator 31 to a terminal 37, while another conductor 38 extends from a terminal 39 of generator 31 to a terminal 40 of cell 32. Generator 31 provides DC current.

A water supply tank is shown at 41. From the latter upstands a pipe 42 which is connected to a pump 43. The latter is electrically driven by current derived from generator 31. From pump 43 a conduit 44 extends to the lower portion of electrolysis cell 32 and is effective to introduce water into the cell. The direct current passes through this water and decomposes the water into its components of hydrogen and oxygen. The hydrogen collects in leg 33 and oxygen in leg 34. A pipe 45 extends upwardly from hydrogen leg 33 and included therein is a pump 46 which is electrically driven from generator 31. Pipe 45 communicates with a cross conduit 47 at point 48. From the latter, one side of cross conduit 47 is connected to a conduit 49 which extends to a hydrogen tank 50. The other side of cross conduit 47 is connected to a hydrogen supply conduit 51 which communicates with hydrogen carburetor 14. A valve 52 is included in hydrogen supply conduit 51.

It is evident that with generator 31 in operation, hydrogen is provided in leg 33 and with pump 46 in operation, this hydrogen is either delivered to tank 50 under pressure or to hydrogen carburetor 14, depending on whether valve 52 is open or closed.

While substantially all of the advantages of the present invention are obtained if the oxygen resulting from the decomposition of the water is merely passed to the ambient atmosphere, some benefit will be derived therefrom because of oxygen having a higher density than air which is mostly nitrogen, and which will deliver more pounds of working fluid to the engine to somewhat compensate for the lost volume and weight flow resulting from the use of hydrogen gas which is of low density. Thus, a tube 53 is shown as extending from oxygen leg 34 of electrolysis cell 32 to air intake 16.

A fuel supply tank is shown at 54 and extending therefrom is a feed pipe 55, the upper end of which is connected to a hydrocarbon fuel carburetor 13. A fuel pump 56 is included in feed pipe 55 and is driven from the engine in a conventional manner.

The operation of carburetors 13 and 14 may be controlled by a link 57 which may be manually operable or operable under pressure from hydrogen gas from conduit 47.

OPERATION — FIRST EMBODIMENT

While the manner in which the embodiment of FIG. 1 operates is believed to be evident from the illustration of the drawings and description of parts set forth above, it may be briefly outlined as follows:

With hydrogen available from tank 50, the engine may be started on hydrogen alone. This may be accomplished by opening valve 52 and adjusting linkage 57 so that no hydrocarbon fuel is initially delivered to fuel intake manifold 11. Starting by hydrogen is preferred because of its gaseous state and wide flammability range.

With the engine in operation, the water in the cooling system of the engine is heated and heat therefrom is conducted to that portion of closed system 20 which is included in the engine. Exhaust gases are generated and passed out of exhaust pipe 18. Heat is derived therefrom by heat exchanger 23 and transferred by conduction to tube 21 of the closed system.

After the engine is started in operation, pump 56 is activated to deliver fuel to carburetor 13 and pump 28 is operated to circulate the working fluid in system 20. The heat transfers the liquid working fluid into a gaseous form to operate turbine 24. The latter drives generator 31 to generate a direct current which is conducted to electrolysis cell 32. With generator 31 in operation, pump 43 is also activated to deliver water from tank 41 to cell 32. This water is decomposed by the direct current passing therethrough which results in decomposition of the water into its oxygen and hydrogen components.

With generator 31 in operation, pump 46 is also activated to deliver the hydrogen from leg 33 of cell 32 either to hydrogen tank 50 or hydrogen carburetor 14. After the engine has been started, linkage 57 is adjusted to provide a desired ratio between the hydrocarbon fuel and the hydrogen which is delivered to the engine.

DESCRIPTION — SECOND EMBODIMENT

Figure 2:
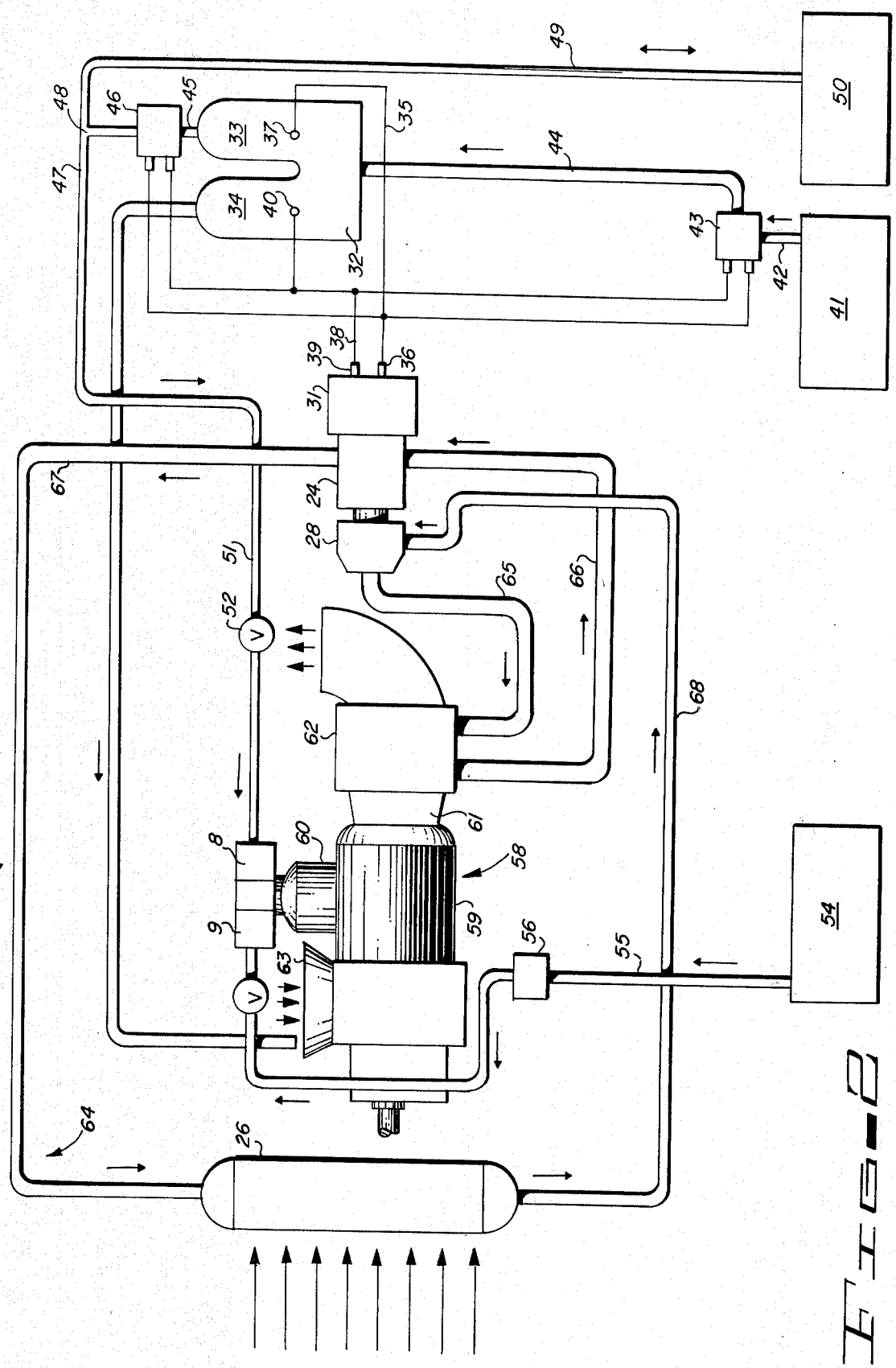
FIG. 2 is a diagrammatic view depicting the invention as applied to a turbine engine.

This embodiment diagrammatically illustrates the incorporation of the present invention into an internal combustion engine of the turbine type as illustrated in FIG. 2. The turbine engine is represented at 58. It includes a casing 59 providing a combustion chamber into which fuel is introduced through an intake 60. A metering control 9 for hydrocarbon fuel is mounted over intake 60 as is a metering control 8 for hydrogen. An exhaust pipe 61 extends from casing 59 and disposed thereabout is a heat exchanger 62, which corresponds to the heat exchanger 23 of FIG. 1. An air intake for engine 58 is represented at 63. The remaining elements illustrated in FIG. 2, with some exceptions, are the same as the corresponding elements of FIG. 1 and have been so designated by like reference characters.

The working fluid system is somewhat different from that of FIG. 1 and is designated generally 64. It comprises a conduit 65 which extends from pump 28 and passes through heat exchanger 62 and emerges therefrom as a conduit 66 which goes to turbine 24. From the latter, another conduit 67 extends to condenser 26. Another conduit 68 connects condenser 26 with pump 28.

The main difference between the apparatus of that of FIG. 2 and that of FIG. 1 is the fact that heat is derived from the exhaust pipe 61 alone and not from a cooling system of the engine.

The operation of the turbine embodiment is substantially the same as that described above in connection with FIG. 1, with the notable exception that the fuel pump indicated at 56 includes a fuel metering control governing the rate at which fuel is delivered from fuel tank 54 to the fuel metering nozzle 9. Also, the hydrogen gas is delivered by conduit 51 to a fuel metering nozzle 8.

DESCRIPTION — THIRD EMBODIMENT

Figure 3:
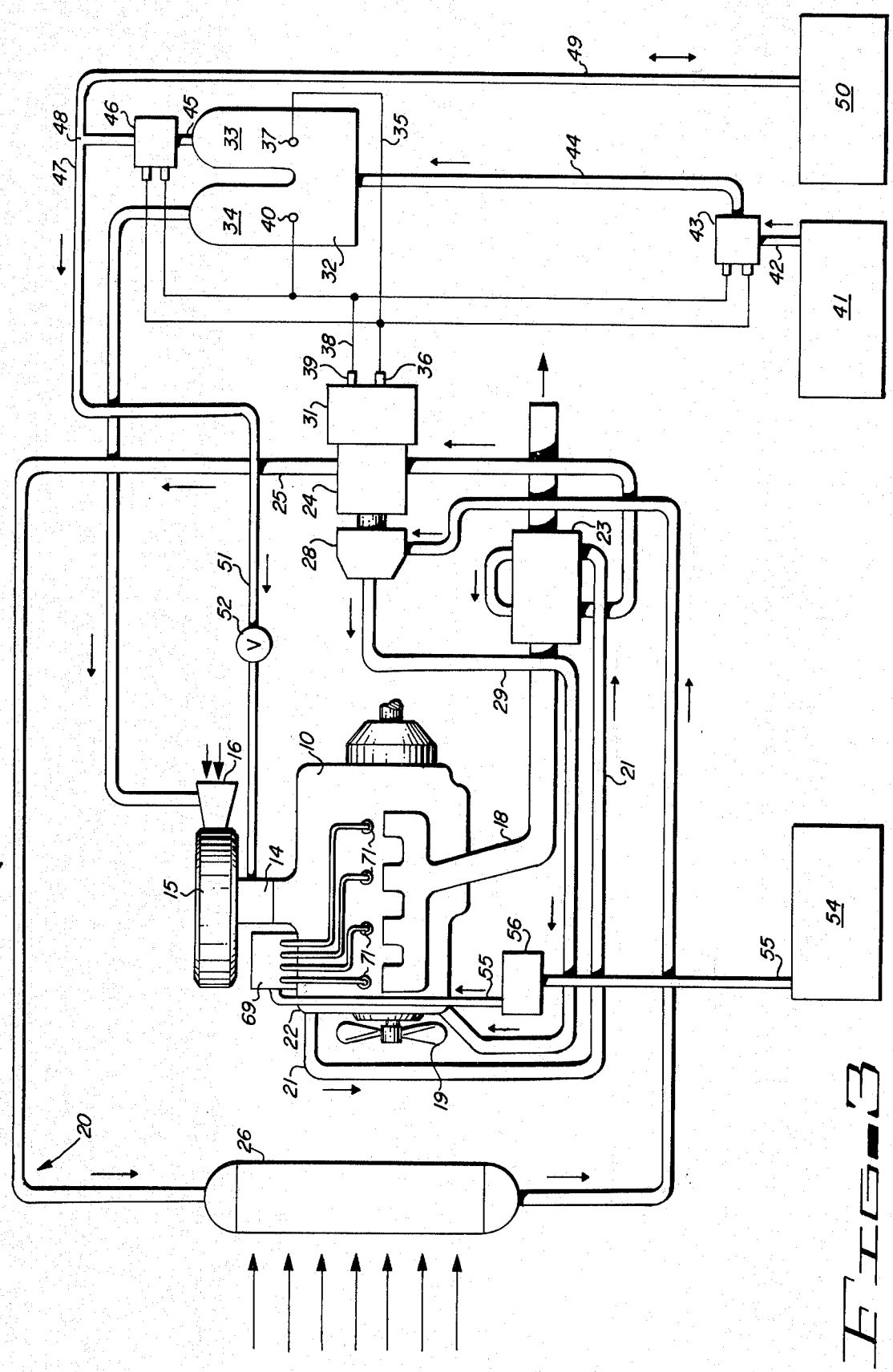
FIG. 3 is another diagrammatic view of the invention as incorporated into a diesel engine.

This embodiment is illustrated in FIG. 3 and shows the invention as applied to a diesel engine. The difference between the diesel engine of FIG. 3 and the conventional engine of FIG. 1 resides in the elimination of the intake manifold 11 and carburetor 13 which are replaced by the fuel injectors. Thus, manifold 69 is mounted on engine block 10 and receives diesel fuel from fuel injector pump and distribution supply tank 54 through tube 55. Distribution tubes 70 extend from manifold 69 to injection ports 71 in block 10.

The operation of the diesel engine embodiment is the same as that of the conventional internal combustion engine of FIG. 1.

THE DIESEL ENGINE MODIFICATION

Figure 4:
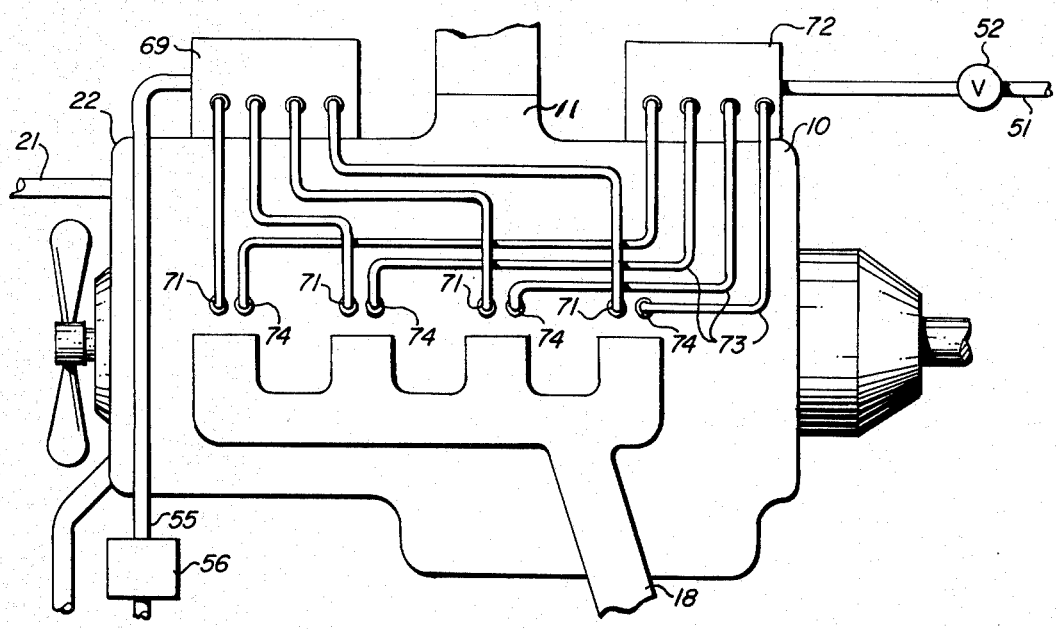
FIG. 4 is a schematic view of a modification of the diesel engine embodiment.

Referring more particularly to FIG. 4, a modification of the diesel engine embodiment is therein illustrated in which hydrogen gas is delivered directly to injection ports in the engine block rather than to the air intake.

Conduit 51 is connected to a hydrogen fuel injector pump and distribution manifold 72 from which extend four distribution tubes 73 which are connected at their other ends to injection ports 74.

In diesel engines, the fuel is ignited by the heat derived from compressing the air. Hydrocarbon fuels have an ignition temperature which is much less than that of hydrogen. Thus, hydrogen is delivered to the engine block only in combination with diesel fuel because, once the fuel is ignited, it will in turn ignite the hydrogen gas.

THE TURBO-GENERATOR

Figure 5:
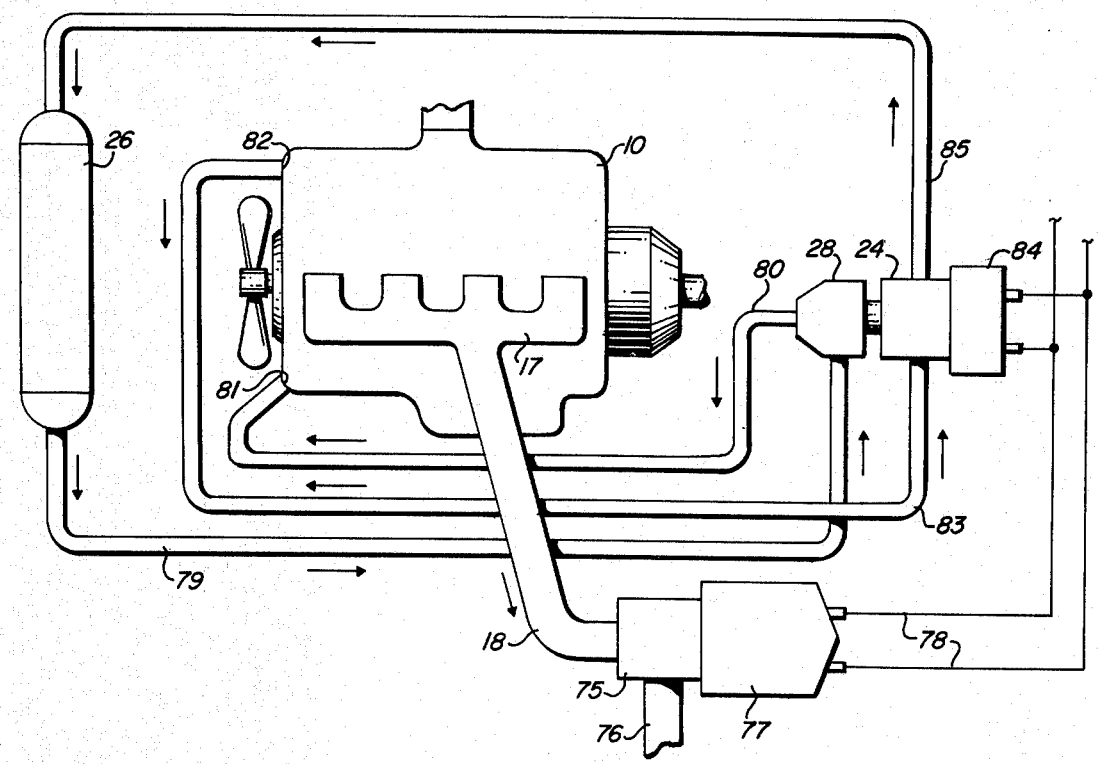
FIG. 5 is a schematic view of an embodiment including a turbo-generator that is powered by exhaust gases.

Referring now to FIG. 5, a modification is therein illustrated in which a turbo-generator is driven directly by exhaust gases. Thus, engine block 10 is shown as having the usual exhaust manifold 17 from which extends an exhaust pipe 18. Mounted on exhaust pipe 18 and in communication therewith is a turbine 75 which is powdered by the exhaust gases from pipe 18. Spent exhaust gases pass out of turbine 75 at gas discharge 76. A generator 77 is driven by a turbine 75. Generator 77 is connected by conductors 78 to the electrolysis cell 32 which is not illustrated in FIG. 5 but corresponds to cell 32 of FIGS. 1, 2 and 3.

It is believed that the turbo-generator method of providing a direct current for the electrolysis cell when used alone will present certain advantages. However, to improve its efficiency, it also may be used in combination with a closed circuit working fluid system which derives heat from the cooling system of the engine, with the heated working fluid driving the turbine of the Rankine Cycle. Thus, as shown in FIG. 5, the closed system for the working fluid comprises a conduit 79 which extends from a condenser 26 to a pump 28 and from the latter another conduit 80 extends to a point 81 where it enters and passes through engine block 10 in a position closely adjacent to the cooling system of the engine, whereby the working fluid in conduit 80 derives heat from the engine cooling system. Conduit 80 passes out of the engine block at point 82 from which point it takes the form of conduit 83 which is connected to turbine 24. From turbine 24 another conduit 85 extends to the other end of condenser 26. Generator 84 is connected to electrolysis cell 32 in the same manner as illustrated and described in connection with FIGS. 1, 2 and 3.

While preferred specific embodiments are herein disclosed, it is to be clearly understood that the invention is not to be limited to the exact constructions, mechanisms and devices illustrated and described because various modifications of these details may be provided in putting the invention into practice.

What is claimed is:
1. In an internal combustion engine,
   a. an engine block;
   b. an exhaust pipe extending from said block;
   c. a turbo-generator comprising a turbine communicating with said exhaust pipe to be powered by exhaust gases emanating from said exhaust pipe and a generator driven by said turbine and producing a DC current;
   d. an electrolysis cell containing water and connected to said generator so that the DC current therefrom decomposes the water into oxygen and hydrogen;
   e. a water tank for supplying water to said electrolysis cell;
   f. a hydrogen carburetor on a engine block for delivering hydrogen to a combustion chamber in said block;
   g. conduit extending from said electrolysis cell to said hydrogen carburetor which conveys hydrogen from the cell to the carburetor;
   h. a hydrocarbon fuel carburetor on said engine block and connected to said hydrocarbon fuel tank, and
   i. linkage connected to said carburetors and operable to vary the ratio of hydrogen and hydrocarbon fuel which is introduced into the combustion chamber of said engine block.
2. The internal combustion engine of claim 1 in which the engine includes a cooling system, together with a closed circuit working fluid system in heat conducting relation to said cooling system and including a pump for circulating the working fluid, a condenser for converting a gaseous state of said working fluid to a liquid state, a turbine powered by said working fluid, and a generator driven by said turbine for delivering DC current to said electrolysis cell to supplement the current supplied by the generator of said turbo-generator.

* * * * *